United States Patent [19]

Guilbert

[11] Patent Number: 5,350,324
[45] Date of Patent: Sep. 27, 1994

[54] TELECOMMUNICATIONS CIRCUIT ASSEMBLIES OF WIRES AND CONNECTORS

[75] Inventor: Paul-Andre Guilbert, Lasalle, Canada

[73] Assignee: Northern Telecom Limited, Montreal, Canada

[21] Appl. No.: 37,834

[22] Filed: Mar. 25, 1993

[51] Int. Cl.$^5$ .............................................. H01B 11/04
[52] U.S. Cl. ...................................... 439/894; 379/417
[58] Field of Search ................. 439/49, 502, 894, 676; 174/32, 33, 34, 36; 379/417

[56] References Cited

U.S. PATENT DOCUMENTS

| | | | |
|---|---|---|---|
| 297,177 | 4/1884 | Shelbourne | 174/34 |
| 957,506 | 5/1910 | Hall | 174/34 |
| 1,277,025 | 8/1918 | Anderegg et al. | 379/417 |
| 3,382,314 | 5/1968 | Nordblad | 174/34 |
| 4,188,080 | 2/1980 | Streble | 174/32 |
| 5,074,801 | 12/1991 | Siemon | 439/557 |

*Primary Examiner*—Neil Abrams
*Attorney, Agent, or Firm*—R. J. Austin

[57] ABSTRACT

A wall socket or patch panel (distribution frame) has pairs of incoming conductor wires connected into terminal pairs in one connector. Wires passing between that connector and another connector are then twisted together with wires associated with other pairs. This provides a compensating reactive coupling to a parasitic reactive coupling existing between conductors within the connectors.

2 Claims, 4 Drawing Sheets

TELECOMMUNICATIONS CIRCUIT ASSEMBLIES OF WIRES AND CONNECTORS

BACKGROUND OF THE INVENTION

1. Field of the Invention

This invention relates to telecommunications circuit assemblies of wires and connectors.

2. Prior Art

In the telecommunications field, incoming telecommunication cables are electrically connected with end user equipment through electrical telecommunication connectors. The conventional transmission mode has, in the past, been at low frequencies, e.g. up to 100 kHz and as technology has improved, electrical connector and cable designs have been capable of transmitting signals at such frequencies without being particularly concerned with cross-talk problems. However, as telecommunications end user equipment have been developed over more recent times, there is an increasingly greater need for the use of high frequency signals to operate this equipment. As frequency increases, cross-talk increases also and it has been found that at much higher frequencies which are now being commonly used, e.g. above 16 MHz, the degree of cross-talk has reached unacceptable proportions. In an attempt to combat this problem, improvements have been made to cable designs until most recently cables of certain designs are being produced which are capable of providing satisfactory suppression of cross-talk at these higher frequencies along the cable lengths. One such cable is that described in U.S. Pat. No. 5,010,210.

As a result of these most recent developments, it is now becoming clear that in a telecommunications line system of cables of new design and connectors, that at high frequencies an undesirable and disproportionate amount of cross-talk is occurring in the connectors themselves. This problem is augmented in a circuit assembly which includes two connectors placed in series with one another and connected by conductor wires.

SUMMARY OF THE INVENTION

The present invention seeks to provide a circuit assembly which lessens the above problem.

Accordingly, the present invention provides a telecommunications circuit assembly comprising an electrical connector having a first and a second conductor pairs and wherein a parasitic reactive coupling exists in the connector between a first conductor of the first conductor pair and a first conductor of the second conductor pair; and individually insulated conductor wires electrically connected to the conductors, one wire to each conductor, with the wires extending to the first conductor of the first conductor pair and to the second conductor of the second conductor pair being twisted together and the wires extending to the second conductor of the first conductor pair and the first conductor of the second conductor pair being twisted together to produce compensating reactive couplings to the parasitic reactive coupling.

The circuit assembly according to the invention is particularly useful in a case where the first and second conductor pairs have terminals which are relatively disposed in a linear array with the terminals of conductors of the first pair lying adjacent to one another and with terminals of the conductors of the second pair disposed one on each side of the terminals of the first pair of conductors. In such a situation, a parasitic reactive coupling exists between each conductor of the first conductor pair and the adjacent conductor of the second conductor pair. To provide compensating reactance, the wire extending to each conductor of the first conductor pair is twisted together with the wire extending to the furthest conductor of the second conductor pair.

In circuit assemblies according to the invention, the value of the compensating reactance is dependent upon the amount of twisting provided between the conductor wires. Hence, the compensating reactance may be adjusted as required to fully compensate for the parasitic reactive coupling.

According to the invention the circuit assembly is applicable to a connector means having first and second connectors. In this arrangement a circuit assembly comprises: connector means comprising a first connector having at least two conductor pairs, and a second connector having at least two conductor pairs, and wherein a parasitic reactive coupling exists in the second connector between a first conductor of the first conductor pair and a second conductor of the second conductor pair, and individually insulated conductor wires each of which extends from an individual conductor of the first connector to an individual conductor of the second connector, and in relation to the second connector the wires extending to the first conductor of the first conductor pair and to the second conductor of the second conductor pair being twisted together and the wires extending to the second conductor of the first conductor pair and to the first conductor of the second conductor pair being twisted together to produce compensating reactive couplings to the parasitic reactive coupling.

The invention also includes a method of making a circuit assembly comprising providing a connector having a first and second conductor pair and wherein a parasitic reactive coupling exists in the connector between a first conductor of the first conductor pair and a first conductor of the second conductor pair; and electrically connecting individual insulated electrical conductor wires to the conductors, one wire to each conductor, while twisting together the wire extending to the first conductor of the first conductor pair and the wire extending to the second conductor of the second conductor pair to produce a compensating reactive coupling to the parasitic reactive coupling.

BRIEF DESCRIPTION OF THE DRAWINGS

One embodiment of the invention will now be described, by way of example, with reference to the accompanying drawings, in which.

DESCRIPTION OF THE PREFERRED EMBODIMENT

Figure 7:
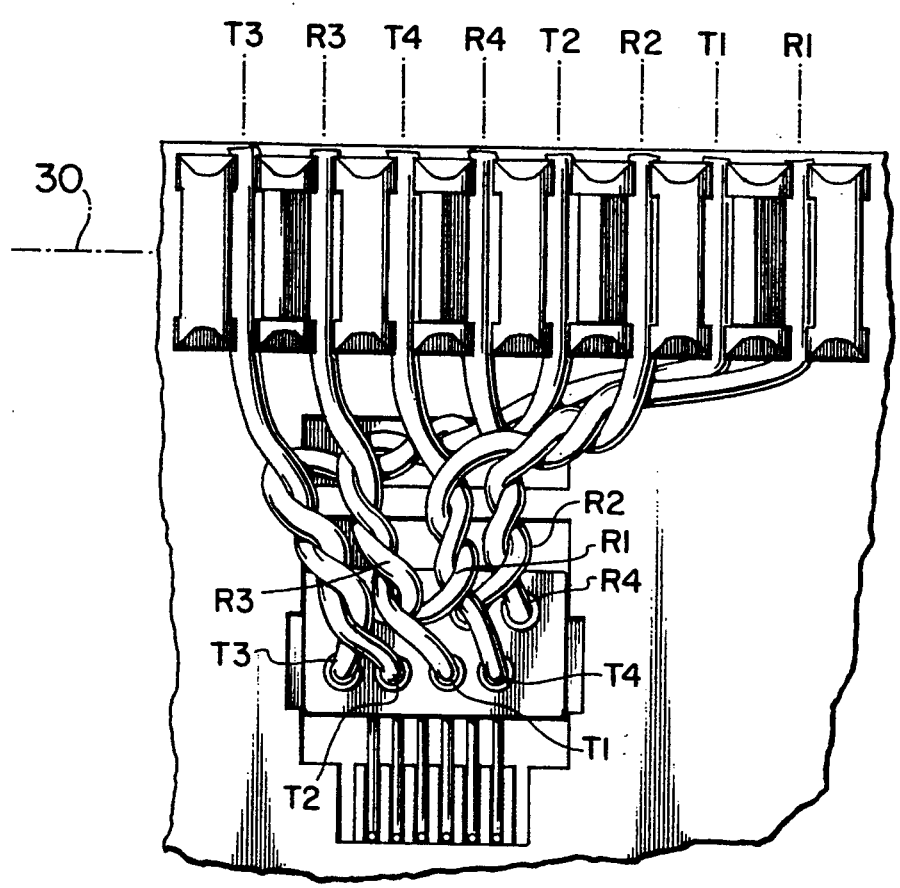
FIG. 7 is a side elevational view of part of the structure of the embodiment and showing positions of connector wires between terminals of two connectors.
Figure 8:
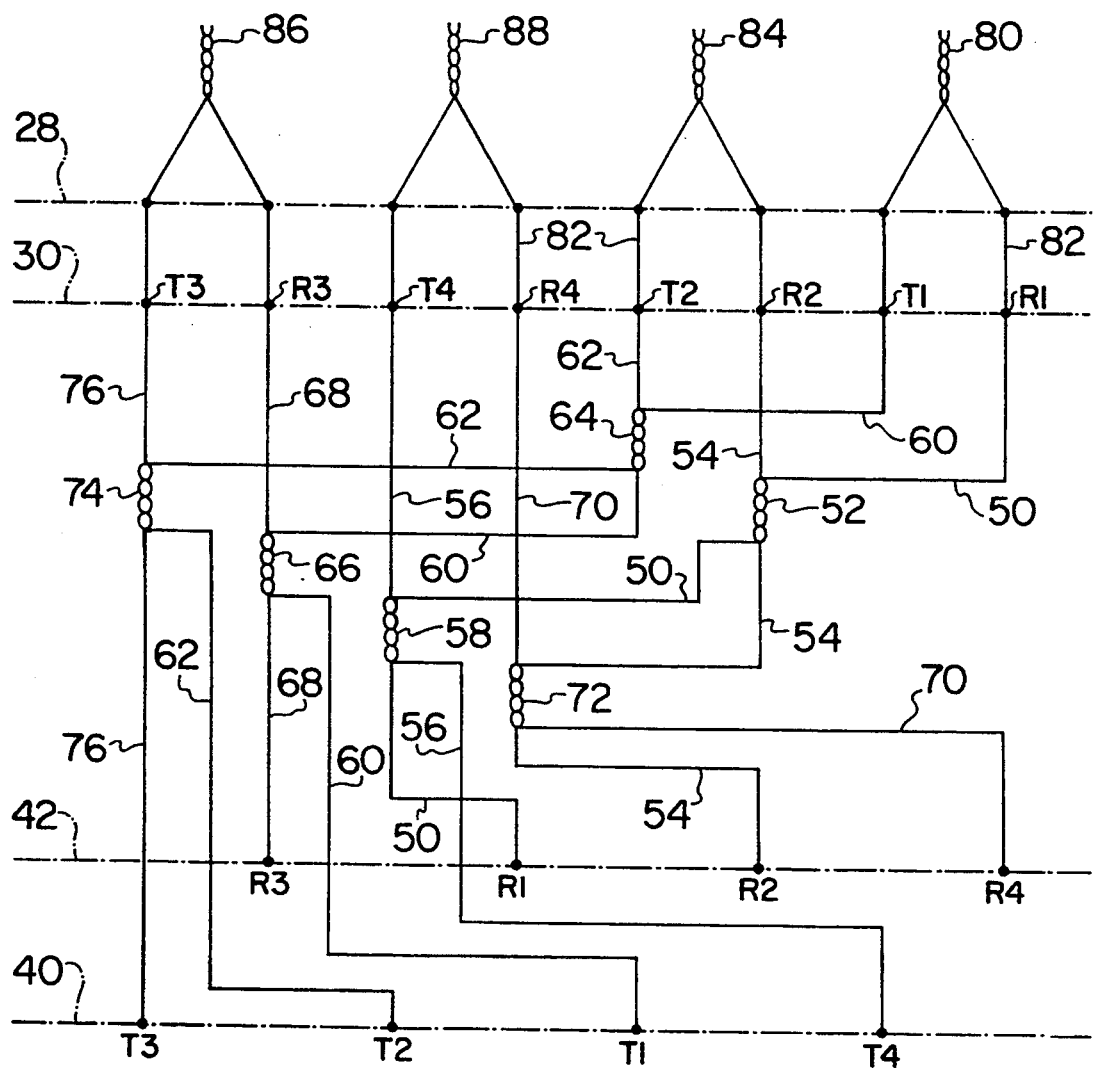
FIG. 8 is a diagrammatic view in the same direction as FIG. 7 and showing the relationship of the wires between the connectors in FIG. 7.

The embodiment of the invention in the form of a circuit assembly as shown in FIGS. 7 and 8, uses a basic connector and housing construction which is known in the prior art.

Figure 1:
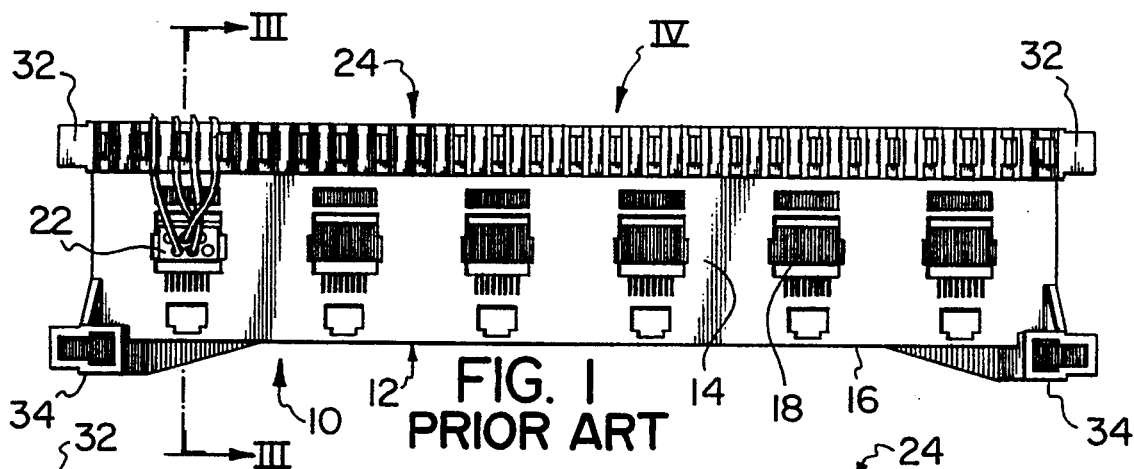
FIG. 1 is an elevational view on one side of a telecommunications circuit assembly according to prior art.
Figure 2:
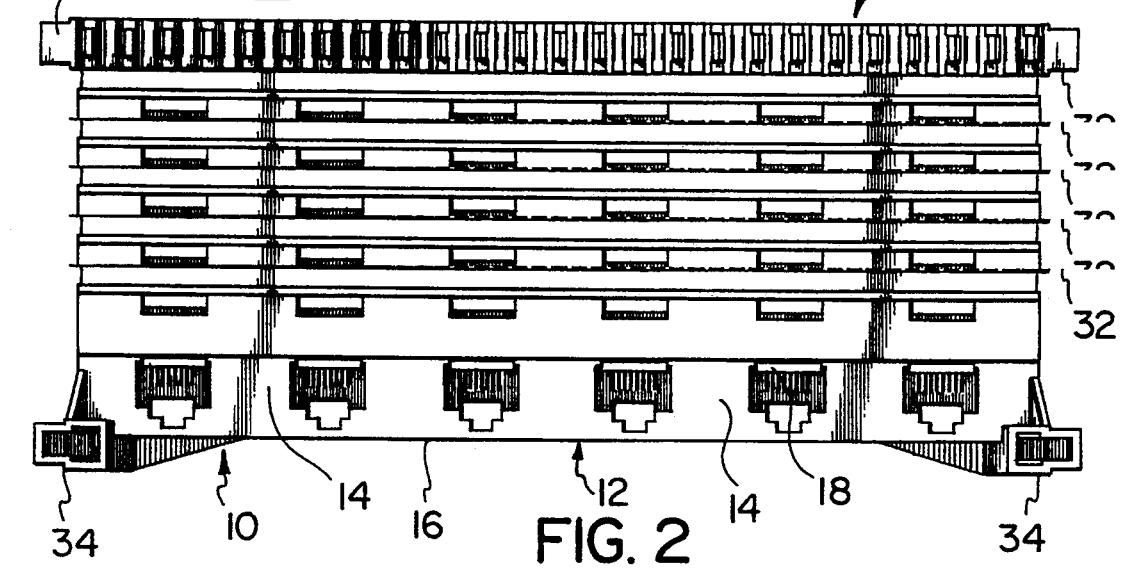
FIG. 2 is an elevational view on the opposite side of the telecommunications assembly of FIG. 1.
Figure 3:
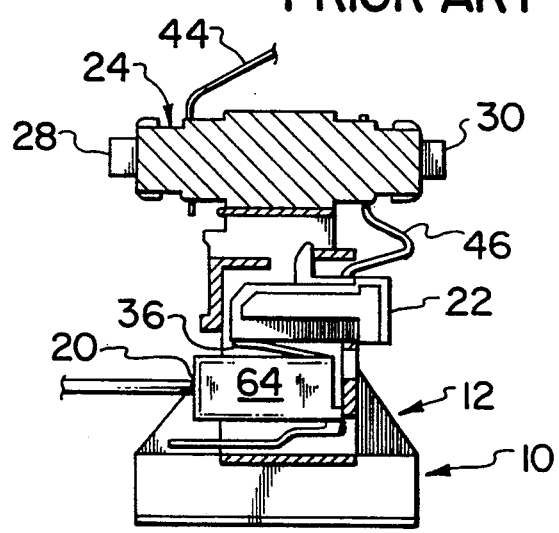
FIG. 3 is a cross-sectional view through the circuit assembly taken along line 3—3 in FIG. 1.
Figure 4:
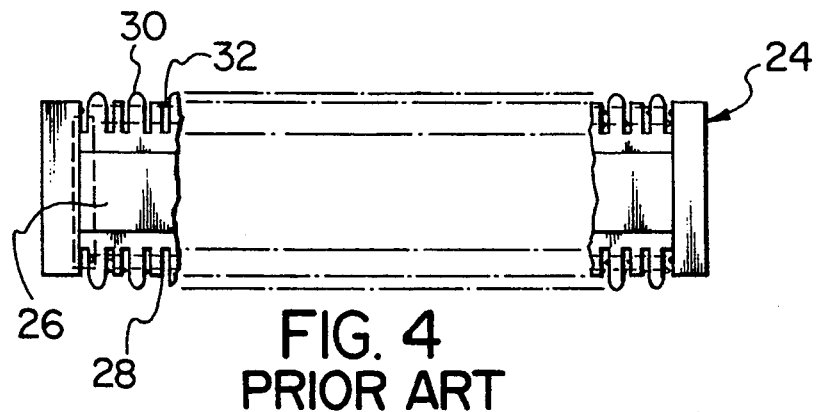
FIG. 4 is a plan view of the assembly in the direction of arrow IV in FIG. 1 and showing details of a connector providing part of the assembly.

The prior art construction as shown in FIGS. 1 and 2, comprises an assembly 10 of connector and connector housing, the housing being a modular jack housing 12 of elongate form and comprising a plurality of walls 14 which extend in parallel and spaced relationship and in conjunction with a side wall 16 of the housing, define a plurality of modular jack receiving chambers 18. The chambers 18 lie in series along the length of the modular jack housing and to a lower side thereof as shown in FIGS. 1 and 2. Each of the housings 18 is for the reception of a telecommunications jack plug 20 which is inserted through an opening in the chamber at a front of the housing as shown in FIG. 3. The chambers 18 extend upwardly, as shown in FIGS. 1, 2 and 3, to an upper region of each chamber, the upper region for accepting a wire connector 22 through a rear opening in the chamber. The assembly 10 also includes an elongate connector 24 which extends along the length of the housing 12 and is secured to the housing by a suitable adhesive. Connector 24 is a structure which may be referred to as a "cross-connect" connector and comprises a substantially planar body 26 (FIG. 4) having along each edge a row of terminals 28 and 30, the two rows facing outwardly from the connector in the plane of the body 26 and in opposite directions. In this known structure, each of the terminals comprises two opposed electrically conductive portions (not shown) arranged on either side of the a molded groove 32 in an edge of the body 26. Because of these conductive portions, each of the terminals is an insulation displacement terminal for cutting into insulating material surrounding a conductor wire when the wire is forced into the groove so that the conductor portions electrically contact the conductor wire. In this structure of connector 24 each terminal along the row 28 is provided at one end of a conductor (not shown) passing through the body 26 and has a corresponding terminal along the row 30. As shown in FIG. 3, the connector 24 is disposed with the row 28 of terminals facing outwardly from the front of the assembly 10 and the row 30 facing outwardly from the rear.

The assembly described with regard to FIGS. 1 to 4 is described in greater detail in U.S. Pat. No. 4,797,124 granted Jan. 10, 1989 to L. A. J. Beaulieu and entitled "Connector Bodies And Assemblies". As described in the above-mentioned patent, the assembly 10 is for use for mounting within a distribution frame used for distribution of electrical wiring from an incoming cable to a customer's premises to access points and terminals within the premises. For this purpose, the assembly 10 is provided with mounting means at each end for location within the distribution frame, the mounting means comprising two end regions 32 at opposite ends of the connector 24 and two end regions 34 on the housing 12. The end regions 32 and 34 are profiled to act as rails for reception in mounting positions in the distribution frame as described in the aforementioned patent.

Figure 5:
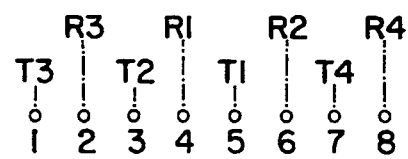
FIG. 5 is a diagrammatic end view of terminals of an other connector of FIG. 3 and showing the relative positions of the terminals.
Figure 6:
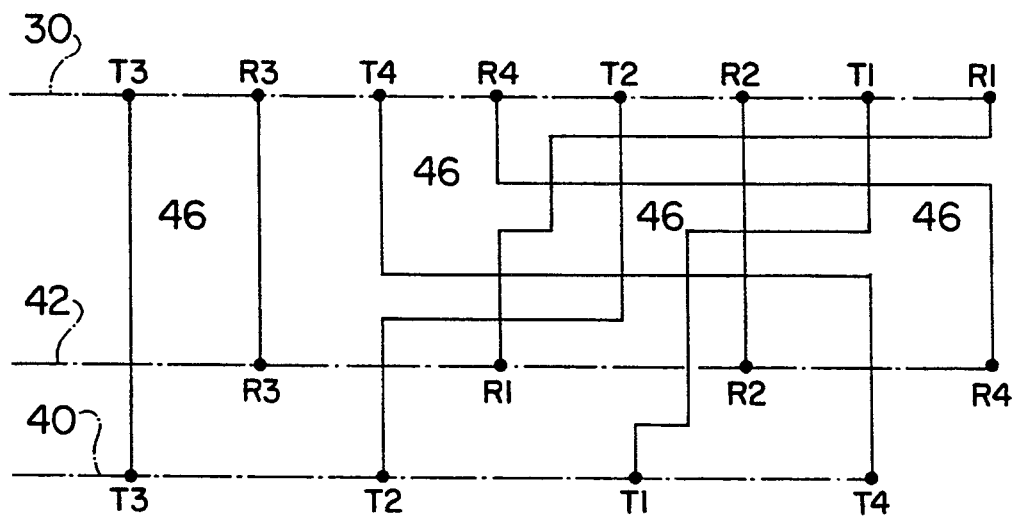
FIG. 6 is a diagrammatic side elevational view of the prior art assembly and showing terminal positions.

It is intended with the structure of the connector 24 that the terminals along each of the rows 28 and 30 are associated as pairs of adjacent terminals with, in each pair one of the terminals being a ring terminal and the other terminal being a tip terminal. Each of the jack plugs 20 to be inserted in a lower part of an individual chamber 18 has a plurality (namely eight) spring terminals 36 which are arranged in a rectilinear array (FIG. 3), these terminals being for electrical connection to terminals of a corresponding wire connector 22 disposed within the upper part of chamber 18, the terminals of the connector 22 being also in a corresponding rectilinear array. The array of terminals in each of the plug 20 and connector 22 is arranged as shown diagrammatically at the positions designated from 1 to 8 in FIG. 5. As may be seen from this figure, it is intended that the plug and connector 22 are to be used with four pairs of wires and for each wire the tip and ring position is shown in FIG. 5. In the nomenclature used in FIG. 5 and also in other FIGS. 'R' and 'T' refer to the tip and ring positions and the number following the tip and ring reference refers to the cable pair with which the particular terminal is to be used. Thus, as examples along the array of terminals, the tip terminal for pair three and the ring terminal for pair three are shown at positions 1 and 2 and the tip terminal for pair two and the ring terminal for pair one are shown at positions 3 and 4. Hence, as shown by FIG. 5, positions 4 and 5 are associated with the ring and tip of the first conductor wire pair. These are flanked by positions 3 and 6 which are respectively the tip and ring for the second conductor wire pair. Positions 1 and 2 have been previously referred to and positions 7 and 8 relate to tip and ring for the fourth conductor wire pair. This array of terminals as shown by FIG. 5 is, in the wire connector 22, located at ends of conductors extending through the wire connector 22 to result in other terminals at the opposite end of the connector i.e. facing rearwardly of the assembly 10. As shown diagrammatically in FIG. 6 these other terminals of each connector 22 are arranged in two parallel linear lines 40 and 42 in staggered relationship. The tip terminals are on line 40 and the ring terminals are on line 42. Also as shown in FIG. 6, pairs of terminals along the row 30 of the connector 24 and close to connector 22 are for connection by individually insulated wires to the tip and ring terminals along the lines 40 and 42.

With the prior arrangement described with reference to FIGS. 1 to 4 and equipped with plug 20 and wire connector 22, normally incoming wires 44 are electrically connected into respective terminals along the row 28 of connector 24 and connector wires 46 are connected between the respective terminals of the row 30 to the terminals along rows 40 and 42 of the connector 22. The connector 22 is then connected by the terminal arrays of the connector 22 with the plug 20 so as to transmit signals to end user equipment. With this prior arrangement, no specific method is used for arranging the conductor wires as they extend to the terminals in rows 40 and 42 of the connector 22, these wires being randomly disposed.

When the prior assembly 10 is used to transmit low frequency signals, then it is apparent that no significant cross-talk problem has been found through the assembly. However, upon the use of such an assembly for transmission of high frequency signals, the cross-talk through the assembly has increased dramatically so as to become exceedingly troublesome. This problem has become highlighted recently when such constructions as the assembly 10 have been used together with more advanced cable designs which are connected to the assemblies 10 and which are themselves capable of transmitting high frequency signals while minimizing cross-talk along the length of cable in an extremely satisfactory manner. It has indeed been found that such an assembly 10 has produced cross-talk over its short length of a total circuit which is far greater than that produced by over 300 meters of new designs of cable attached to it. The problem which exists is caused basically by the design of the connector 24 and also by the designs of the connector 22 and the plug 20. Because conductor paths through the connectors 22 and 24 are substantially parallel between the terminals and also because of the relative disposition of the array of terminals as shown by FIG. 5, cross-talk is created because of parasitic reactive couplings. In reference to FIG. 5, the greatest parasitic reactive coupling exists between pairs 1 and 2. This reactive coupling occurs, in the mains between 'R1' and 'T2' and between 'T1' and 'R2' conductor paths at positions 3 and 4 and 5 and 6 respectively. Lesser parasitic couplings exist between 'T2' and 'R3' paths and between 'R2' and 'T4' paths, followed by parasitic couplings between 'R1' and 'R3' paths and 'T1' and 'T4'. There are other parasitic reactive couplings of still lesser note and which perhaps produce negligible cross-talk such as the coupling between 'R3' and 'T4' and 'T3' and 'R4' paths.

In view of the fact that great efforts and successes have been made in producing telecommunications cables which significantly reduce cross-talk along the cable lengths, then the electrical conductors which provide part of the conductor paths, fail significantly in reducing cross-talk to a comparable degree.

As will now be shown, in the embodiment, a circuit assembly is provided which in use with high frequency signal transmission is extremely effective in suppressing cross-talk between conductor paths associated with different pairs of conductor wires.

In the embodiment, insulated conductor wires connecting the respective terminals along the row 30 are twisted together in a certain relationship in order to provide a compensating reactance to the parasitic reactive coupling existing in the assembly. This is shown by FIGS. 7 and 8. FIG. 7 is an actual representation of the insulated conductor wires passing through to the terminals on lines 40 and 42. As the conductor wire configuration is somewhat complex, the diagrammatic view of FIG. 8 represents the actual relationship of the wires extending between the various terminals. As is more clearly shown by FIG. 8, the conductor wire 50 extending between the terminal 'R1' of the row 30 of connector 24 to the terminal 'R1' on line 42 of the connector 42 is twisted, as symbolically shown at 52, for a predetermined number of twists with the wire 54 extending between terminals 'R2' of the connectors 22 and 24. In addition, the insulated conductor wire 50 between the terminals 'R1' is also twisted with the insulated wire 56 extending between the terminals 'T4' as shown at position 58. Also, the insulated wire 60 between terminals 'T1' is twisted, as shown at position 64, with the insulated wire 62 extending between terminals 'T2' and at position 66 with the insulated wire 68 extending between the terminals 'R3'. In addition, the insulated wire 54 between terminals 'R2' is twisted at position 72 with the wire 70 between terminals 'R4' and the insulated wire 62 between terminals 'T2' is twisted at position 74 with the insulated wire 76 between terminals 'T3'. Hence, there are six different twisting operations between wires extending from different pairs of twisted wires connected to terminals 28 and the amount of twist provided at each position 52, 58, 64, 66, 72 and 74 is predetermined to provide a compensating reactance to the parasitic reactive coupling existing in the assembly 10, the twisting in each case providing both an inductive and a capacitive compensating reactance. It has been found as with this embodiment, that the compensating reactance if employed correctly may be used to eliminate substantially any cross-talk occurring as signals pass through the assembly 10.

In FIG. 8 it is made clear that the wires being twisted together between the connectors 22 and 24 are in fact wires associated with different incoming pairs from outside the assembly 10. For instance, as shown by FIG. 8, a first incoming pair 80 of twisted together insulated wires provides an associated tip and ring wire extend respectively, to the tip and ring terminals for 'T1' and 'R1' along the row 28 of terminals in the connector 24. These terminals are connected by conductors 82 in the connector 24 with terminals 'T1' and 'R1' in terminal row 30.

Similarly, second, third and fourth incoming pairs 84, 86 and 88 of twisted together insulated wires are connected through connector 24 with corresponding tip and ring terminals in terminal row 30. The individual wires which are twisted together in each case between terminal row 30 and terminal rows 40 and 42 are thus associated with different incoming pairs. For instance, at twist position 52, the insulated wire 50 between positions 'R1' is associated with incoming pair 80 whereas insulated wire 52 is associated with incoming pair 84.

What is claimed is:

1. A telecommunications circuit assembly comprising:
    a first connector and a second connector, the first connector having a plurality of conductors disposed in a rectilinear array wherein a parasitic reactive coupling exists between a first of the conductors and a second of the conductors adjacent to the first conductor in one direction along the array and wherein a parasitic reactive coupling exists between the first conductor and a third of the conductors adjacent to the first conductor in the opposite direction along the array;
    and a plurality of individually insulated conductor wires each electrically connecting an individual conductor of the first connector with an individual conductor of the second connector with the insulated conductor wire extending from the first conductor twisted along one part of its length solely with another of the conductor wires and twisted along another part of its length with a further of the conductor wires, the other and the further conductor wires selectively extending to fourth and fifth conductors whereby the twisting of the first conductor wire with the other conductor wire and with the further conductor wire produces compensating reactive couplings to the parasitic reactive couplings.

2. A method of making a telecommunications assembly comprising:
    providing a first connector and a second connector, the first connector having a plurality of conductors disposed in a rectilinear array wherein a parasitic reactive coupling exists between a first of the conductors and a second of the conductors adjacent to the first conductor in one direction along the array and wherein a parasitic reactive coupling exists between the first conductor and a third of the conductors adjacent to the first conductor in the opposite direction along the array;

connecting a plurality of individually insulated conductor wires each to an individual conductor of the first connector and to an individual conductor of the second conductor while twisting part of the length of the conductor wire extending from the first conductor with another of the conductor wires and twisting another part of said length with a further of the conductor wires, the other and the further conductor wires being selectively connected to fourth and fifth conductors of the first connector whereby the twisting of the first conductor wire with the other conductor wire and with the further conductor wire produces compensating reactive couplings to the parasitic reactive couplings.

* * * * *